US010550543B1

(12) United States Patent
Ennis et al.

(10) Patent No.: US 10,550,543 B1
(45) Date of Patent: Feb. 4, 2020

(54) MOTOR GRADER 3D GRADE CONTROL

(71) Applicant: Caterpillar Trimble Control Technologies LLC, Dayton, OH (US)

(72) Inventors: Nathan Ennis, Peoria, IL (US); Patrick Pecchio, Peoria, IL (US); Geoffrey Mills, Peoria, IL (US); Christopher Padilla, Peoria, IL (US); Yongliang Zhu, Peoria, IL (US); Jason Hill, Denver, CO (US); Colin Daniell, Christchurch (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 0 days.

(21) Appl. No.: 16/242,148

(22) Filed: Jan. 8, 2019

(51) Int. Cl.
*E02F 3/84* (2006.01)
*E02F 3/76* (2006.01)
*G01B 7/30* (2006.01)
*G05B 19/401* (2006.01)
*G05B 19/402* (2006.01)
*G05D 3/12* (2006.01)

(52) U.S. Cl.
CPC .............. *E02F 3/847* (2013.01); *G01B 7/30* (2013.01); *G05B 19/401* (2013.01); *G05B 19/402* (2013.01); *G05D 3/125* (2013.01); *G05D 2201/0202* (2013.01)

(58) Field of Classification Search
CPC ......... E02F 3/841; E02F 3/7636; E02F 3/847; G01B 7/30; G05B 19/401; G05B 19/402; G05D 3/125
See application file for complete search history.

(56) References Cited

U.S. PATENT DOCUMENTS

| | | | | |
|---|---|---|---|---|
| 9,217,238 | B2* | 12/2015 | Sharma | E02F 9/2033 |
| 9,290,910 | B2* | 3/2016 | Sharma | E02F 9/2025 |
| 9,637,889 | B2* | 5/2017 | Elkins | E02F 3/844 |
| 10,030,357 | B1* | 7/2018 | Horstman | E02F 3/7636 |
| 2012/0239258 | A1* | 9/2012 | Konno | E02F 3/845 |
| | | | | 701/50 |
| 2014/0041883 | A1* | 2/2014 | Wahlmark | E02F 3/764 |
| | | | | 172/1 |
| 2017/0284067 | A1* | 10/2017 | Tevis | E02F 9/26 |

* cited by examiner

*Primary Examiner* — Yazan S Soofi
(74) *Attorney, Agent, or Firm* — Kilpatrick Townsend & Stockton

(57) ABSTRACT

Systems and methods for providing grade control on a motor grader without the use of masts attached to the blade. Embodiments include a body angle sensor configured to detect movement of a construction machine's body, a front GNSS receiver configured to detect a geospatial position of the construction machine's body within a world space, a drawbar angle sensor configured to detect movement of the construction machine's drawbar, and a blade angle sensor configured to detect movement of the construction machine's blade. Two positions on the blade may be calculated first within a machine space and subsequently within the world space. Movement of at least one articulating connection may be caused based on the blade positions within the world space.

20 Claims, 11 Drawing Sheets

MOTOR GRADER 3D GRADE CONTROL

BACKGROUND

Modern construction machines have dramatically increased the efficiency of performing various construction projects. For example, earthmoving machines employing automatic slope control systems are able to grade a project area using fewer passes and in less time than what was previously done manually. As another example, modern asphalt pavers and other road makers have allowed replacement of old roads and construction of new roads to occur on the order of hours and days instead of what once took place over weeks and months. Construction crews also now comprise fewer individuals due to the automation of various aspects of the construction process. Much of the technological advances of construction machines are owed in part to the availability of accurate sensors that allow real-time monitoring of the condition and position of a machine's components and/or the environment surrounding the machine. Despite the improvements in modern construction machines, new systems, methods, and techniques are still needed.

SUMMARY

In a first aspect of the present invention, a construction machine is provided. The construction machine may include a body including at least a front frame. The construction machine may also include a body angle sensor configured to detect body angle data corresponding to movement of the body. The construction machine may further include a front GNSS receiver mounted to the body and configured to detect a geospatial position of the body within a world space. The construction machine may further include a drawbar coupled to the body via a first articulating connection. The construction machine may further include a drawbar angle sensor configured to detect drawbar angle data corresponding to movement of the drawbar. The construction machine may further include a blade coupled to the drawbar via a second articulating connection. The construction machine may further include a blade angle sensor configured to detect blade angle data corresponding to movement of the blade.

The construction machine may further include one or more processors configured to perform operations. The operations may include receiving, from the body angle sensor, the body angle data. The operations may also include receiving, from the drawbar angle sensor, the drawbar angle data. The operations may further include receiving, from the blade angle sensor, the blade angle data. The operations may further include receiving, from the front GNSS receiver, the geospatial position of the body within the world space. The operations may further include calculating, based on the drawbar angle data and the blade angle data, a first and a second position on the blade within a machine space. In some embodiments, the machine space includes a machine-space reference point positioned within the construction machine. The operations may further include calculating, based on the body angle data, the geospatial position, and the first and second positions on the blade within the machine space, a first and a second position on the blade within the world space. The operations may further include causing movement of at least one of the first articulating connection and the second articulating connection based on the first and second positions on the blade within the world space.

In some embodiments, the body angle sensor is mounted to the front frame, the drawbar angle sensor is mounted to the drawbar, the blade angle sensor is mounted to the blade, and the front GNSS receiver is mounted to the front frame. In some embodiments, the geospatial position of the body is a geospatial position of the front frame. In some embodiments, the construction machine includes a rear GNSS receiver mounted to a cab of the body and configured to detect a geospatial position of the cab. In some embodiments, the operations include receiving, from the rear GNSS receiver, the geospatial position of the cab, calculating, based on the geospatial position of the front frame and the geospatial position of the cab, a machine heading of the construction machine, and causing movement of at least one of the first articulating connection and the second articulating connection based on the machine heading. In some embodiments, the machine-space reference point is the first articulating connection. In some embodiments, calculating the first and second positions on the blade within the machine space includes calculating a first and a second vector beginning at the machine-space reference point and ending at the first and second positions on the blade within the machine space. In some embodiments, the first and second positions on the blade within the machine space are located at opposite ends along a bottom tip of the blade. In some embodiments, the operations include calculating, based on the body angle data and the geospatial position of the body, a space translation variable.

In a second aspect of the present invention, a machine control system is provided. The machine control system may include a body angle sensor configured to detect body angle data corresponding to movement of a body of a construction machine. In some embodiments, the body includes at least a front frame. The machine control system may also include a front GNSS receiver configured to detect a geospatial position of the body within a world space. The machine control system may further include a drawbar angle sensor configured to detect drawbar angle data corresponding to movement of a drawbar of the construction machine. In some embodiments, the drawbar is coupled to the body via a first articulating connection. The machine control system may further include a blade angle sensor configured to detect blade angle data corresponding to movement of a blade of the construction machine. In some embodiments, the blade is coupled to the drawbar via a second articulating connection.

The machine control system may further include one or more processors configured to perform operations. The operations may include receiving, from the body angle sensor, the body angle data. The operations may also include receiving, from the drawbar angle sensor, the drawbar angle data. The operations may further include receiving, from the blade angle sensor, the blade angle data. The operations may further include receiving, from the front GNSS receiver, the geospatial position of the body within the world space. The operations may further include calculating, based on the drawbar angle data and the blade angle data, a first and a second position on the blade within a machine space. In some embodiments, the machine space includes a machine-space reference point positioned within the construction machine. The operations may further include calculating, based on the body angle data, the geospatial position, and the first and second positions on the blade within the machine space, a first and a second position on the blade within the world space. The operations may further include causing movement of at least one of the first articulating connection and the second articulating connection based on the first and second positions on the blade within the world space.

In some embodiments, the body angle sensor is mounted to the front frame, the drawbar angle sensor is mounted to the drawbar, the blade angle sensor is mounted to the blade, and the front GNSS receiver is mounted to the front frame. In some embodiments, the geospatial position of the body is a geospatial position of the front frame. In some embodiments, the machine control system includes a rear GNSS receiver mounted to a cab of the body and configured to detect a geospatial position of the cab. In some embodiments, the operations include receiving, from the rear GNSS receiver, the geospatial position of the cab, calculating, based on the geospatial position of the front frame and the geospatial position of the cab, a machine heading of the construction machine, and causing movement of at least one of the first articulating connection and the second articulating connection based on the machine heading. In some embodiments, the machine-space reference point is the first articulating connection. In some embodiments, calculating the first and second positions on the blade within the machine space includes calculating a first and a second vector beginning at the machine-space reference point and ending at the first and second positions on the blade within the machine space. In some embodiments, the first and second positions on the blade within the machine space are located at opposite ends along a bottom tip of the blade. In some embodiments, the operations include calculating, based on the body angle data and the geospatial position of the body, a space translation variable.

In a third aspect of the present invention, a method of operating a construction machine is provided. The method may include receiving, from a body angle sensor, body angle data corresponding to movement of a body of a construction machine. In some embodiments, the body includes at least a front frame. The method may also include receiving, from a front GNSS receiver mounted to the body, a geospatial position of the body within the world space. The method may further include receiving, from a drawbar angle sensor, drawbar angle data corresponding to movement of a drawbar of the construction machine. In some embodiments, the drawbar is coupled to the body via a first articulating connection. The method may further include receiving, from a blade angle sensor, blade angle data corresponding to movement of a blade of the construction machine. In some embodiments, the blade is coupled to the drawbar via a second articulating connection. The method may further include calculating, based on the drawbar angle data and the blade angle data, a first and a second position on the blade within a machine space. In some embodiments, the machine space includes a machine-space reference point positioned within the construction machine. The method may further include calculating, based on the body angle data, the geospatial position, and the first and second positions on the blade within the machine space, a first and a second position on the blade within the world space. The method may further include causing movement of at least one of the first articulating connection and the second articulating connection based on the first and second positions on the blade within the world space.

In some embodiments, the body angle sensor is mounted to the front frame, the drawbar angle sensor is mounted to the drawbar, the blade angle sensor is mounted to the blade, and the front GNSS receiver is mounted to the front frame. In some embodiments, the geospatial position of the body is a geospatial position of the front frame. In some embodiments, the method includes receiving, from a rear GNSS receiver mounted to a cab of the body, the geospatial position of the cab, calculating, based on the geospatial position of the front frame and the geospatial position of the cab, a machine heading of the construction machine, and causing movement of at least one of the first articulating connection and the second articulating connection based on the machine heading. In some embodiments, the machine-space reference point is the first articulating connection. In some embodiments, calculating the first and second positions on the blade within the machine space includes calculating a first and a second vector beginning at the machine-space reference point and ending at the first and second positions on the blade within the machine space. In some embodiments, the first and second positions on the blade within the machine space are located at opposite ends along a bottom tip of the blade.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments of the present disclosure relate to systems, methods, and other techniques for providing grade control on a motor grader without the use of masts attached to the blade. Drawbacks of blade mounted three-dimensional (3D) grade control systems are well documented and include, but are not limited to, reduced possible range of blade placements, increased risk of theft, increased potential damage to the grader, to the masts, or to the 3D components caused by driving the masts into the cab when rotating the blade, side shifting the blade, and/or side shifting the entire drawbar. With many mast-based systems, the operator is expected to remove the 3D components from the masts at the end of a work shift. These limitations, among others, are overcome by embodiments of the present invention by providing grade control by strategically mounting and/or integrating several rotation sensors (e.g., inertial measurement units (IMU)) and at least one positioning sensor (e.g., Global Navigation Satellite System (GNSS) receiver) with the grader so as to establish two positions on the grader blade within a world space.

Figure 1:
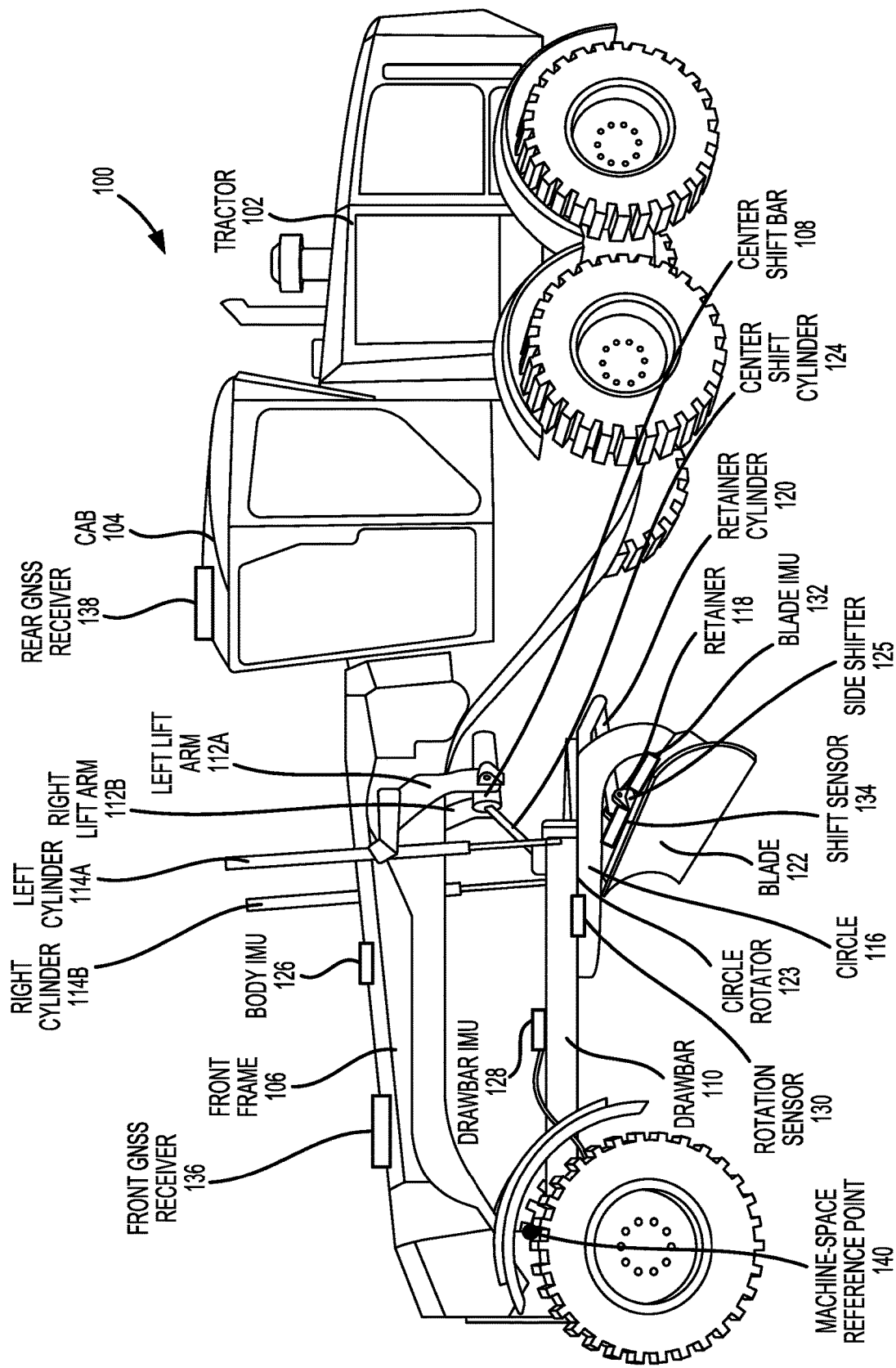
FIG. 1 illustrates a perspective view of a motor grader, according to some embodiments of the present invention.

FIG. 1 illustrates a perspective view of a motor grader 100 (or alternatively referred to as a "grader" or "road grader"), according to some embodiments of the present invention. Motor grader 100 is a type of construction machine used to create flat surfaces in accordance with a grading operation, which may demand a particular pitch, cross-slope, and/or elevation over a project area. Motor grader 100 may be used to perform rough grading (low precision) or fine grading (high-precision) tasks of the grading operation. As used herein, the term "construction machine" may refer to motor grader 100 or to any one of a number of different types of construction machines, including pavers (e.g., concrete, asphalt, slipform, vibratory, etc.), graders, compactors, excavators, scrapers, loaders, etc., each of which may have components similar to those described in reference to motor grader 100.

In some embodiments, motor grader 100 may include a tractor 102 with wheels, axles, and a gasoline-, diesel-, electric-, or steam-powered engine for providing power and traction to motor grader 100 to drive along a desired path, often at a constant speed. In the illustrated embodiment, motor grader 100 includes three axles including one front axle and two rear axles, with the engine and a cab 104 located above the two rear axles. An operator of motor grader 100 may control the construction machine within cab 104 using various input devices such as computers, levers, switches, buttons, pedals, etc. Input devices may alternatively or additionally be located at other locations throughout motor grader 100. Steering of motor grader 100 may be accomplished by controlling the angle of the front axle which may, in some embodiments, cause frame articulation between the front and rear axles to allow motor grader 100 to turn along a small turning radius.

In some embodiments, motor grader 100 includes a front frame 106, which may be rigidly connected to cab 104 and/or tractor 102 at a rear end of front frame 106, and may be connected to a drawbar 110 at a bottom end of front frame 106. Alternatively, front frame 106 may be connected to cab 104 and/or tractor 102 at the rear end of front frame 106 via an articulating connection. Front frame 106 may further be rigidly connected to a center shift bar 108 at or near the rear end of front frame 106. Front frame 106 may be partially elongated and may be substantially parallel to a longitudinal direction. In some embodiments, front frame 106 serves as a primary connection between the front and rear axles. In some embodiments, front frame 106 is rigidly connected to a left lift arm 112A and a right lift arm 112B at lateral sides of front frame 106 and/or at a bottom side of front frame 106. In some embodiments, left lift arm 112A is connected to a left cylinder 114A and right lift arm 112B is connected to a right cylinder 114B. In some embodiments, front frame 106 may further be connected to the front axle at front and/or bottom end of front frame 106.

In some embodiments, motor grader 100 includes a center shift bar 108, which may be rigidly connected to front frame 106 at a top end of center shift bar 108, and may be connected to a drawbar 110 via an articulating connection at a bottom end of center shift bar 108. In some embodiments, center shift bar 108 may be rigidly connected to left and right lift arms 112 such that center shift bar 108 extends between the bottom ends of left and right lift arms 112. In some embodiments, center shift bar 108 is connected to a center shift cylinder 124 that is connected to drawbar 110 at a top side of drawbar 110.

In some embodiments, motor grader 100 includes a drawbar 110, which may be connected to front frame 106 at a forward end of drawbar 110 via an articulating connection, and may be connected to a circle 116 at a rear end of drawbar 110 via an articulating connection. In some embodiments, the articulating connection between drawbar 110 and front frame 106 may allow drawbar 110 to rotate with respect to front frame 106 in at least one direction (e.g., yaw, pitch, roll). Drawbar 110 may be partially elongated and may be entirely or partially positioned vertically below front frame 106. In some embodiments, drawbar 110 may be connected to left cylinder 114A at a left side of drawbar 110 and to right cylinder 114B at a right side of drawbar 110 such that extension or retraction of left and right cylinders 114 cause a corresponding movement of drawbar 110 (e.g., roll or pitch). In some embodiments, drawbar 110 may be connected to center shift cylinder 124 such that extension or retraction of center shift cylinder 124 causes a corresponding movement of drawbar 110 (e.g., yaw).

In some embodiments, motor grader 100 includes a circle 116, which may be connected to drawbar 110 at a top side of circle 116 via an articulating connection, and may be connected to a retainer 118 at a bottom side of circle 116 via an articulating connection. In some embodiments, the articulating connection between circle 116 and drawbar 110 may allow circle 116 to rotate with respect to drawbar 110 in a circular direction. In some embodiments, the articulating connection between circle 116 and drawbar 110 may be configured to allow complete or partial circular rotation of circle 116 with respect to drawbar 110. In some embodiments, the articulating connection between circle 116 and drawbar 110 comprises a circle rotator 123, which may include a motor or other actuating device that causes circle 116 to rotate with respect to drawbar 110 in a circular direction. In some embodiments, circle 116 is connected to a retainer cylinder 120.

In some embodiments, motor grader 100 includes a retainer 118, which may be connected to circle 116 at a rear side of retainer 116 via an articulating connection, and may be connected to a blade 122 at a front side of retainer 116 via an articulating connection. In some embodiments, the articulating connection between retainer 118 and circle 116 may allow retainer 118 to rotate with respect to circle 116 in at least one direction (e.g., pitch). In some embodiments, retainer 118 is connected to retainer cylinder 120 at a rear side of retainer 118 such that extension or retraction of retainer cylinder causes a corresponding movement of retainer 118 (e.g., pitch).

In some embodiments, motor grader 100 includes a blade 122, which may be connected to retainer 118 at a rear side of blade 122 via an articulating connection. In some embodiments, the articulating connection between blade 122 and retainer 118 may allow blade 122 to shift with respect to retainer 118 in at least one direction (e.g., transverse direction). In some embodiments, the articulating connection between blade 122 and retainer 118 comprises a side shifter 125 configured to shift blade 122 in the left or right transverse direction. Blade 122 may be the primary means through which motor grader 100 interacts with the material to be graded, although some embodiments may include one or more additional blades (e.g., a front blade attached to a front side of center shift bar 108). Blade may include a bottom, reinforced tip having two ends (e.g., a left end and a right end).

In accordance with the configurability of the above-described rigid bodies, articulating connections, and actuators of motor grader 100, blade 122 may be placed in a wide range of positions to accomplish a grading operation. In some embodiments, motor grader 100 may include fewer or additional rigid bodies, articulating connections, and actuators than those described above thereby providing a wider or narrower range of positions of blade 122. To allow 3D tracking of blade 122 in accordance with embodiments of the present invention, various sensors (e.g., rotation sensors, positioning sensors) may be mounted to and/or integrated with the above-described components of motor grader 100. As used herein, a sensor that is described as being "mounted" to a component may include embodiments in which the sensor is attached, connected, coupled, joined, fastened, affixed, secured, and/or integrated with the component.

As used herein, an IMU may refer to any electronic device capable of detecting acceleration, angular rate, and/or angular position. For example, an IMU may include one or more accelerometers and/or one or more gyroscopes, among other possibilities. As used here, an angle sensor may refer to any electronic device capable of detecting angular rate and/or angular position. As such, an IMU as described herein may include an angle sensor and/or an acceleration sensor. In some embodiments, an angle sensor may directly detect angular rate and may integrate to obtain angular position, or alternatively an angle sensor may directly measure angular position and may determine a change in angular position (e.g., determine the derivative) to obtain angular rate. In many instances, an angle sensor is used to determine the yaw angle (rotation angle with respect to a vertical axis), the pitch angle (rotation angle with respect to a transverse axis), and/or the roll angle (rotation angle with respect to a longitudinal axis).

As used herein, a GNSS receiver may refer to any electronic device capable of detecting a 3D position within a world space by analyzing received positioning signals. In some embodiments, a GNSS receiver may use wireless signals that are transmitted from medium Earth orbit (MEO) or geostationary Earth orbit (GEO) satellites to GNSS receivers to determine position, velocity, and time information for the GNSS receivers. Examples of currently operational GNSSs include the United States' Global Positioning System (GPS), the Russian Global Navigation Satellite System (GLONASS), the Chinese BeiDou Satellite Navigation System, the European Union's (EU) Galileo, and the Satellite-based Augmentation System (SBAS). Today, GNSS receivers are used in a wide range of applications, including navigation (e.g., for automobiles, planes, boats, persons, animals, freight, military precision-guided munitions, etc.), surveying, mapping, and time referencing.

In some embodiments, a body IMU 126 (or, more specifically, a body angle sensor) is mounted to front frame 106 so as to detect angular movement of front frame 106. In some embodiments, body IMU 126 may be configured to detect a yaw angle, a pitch angle, and/or a roll angle associated with angular movement of front frame 106. Alternatively or additionally, body IMU 126 may be mounted to any component that is rigidly connected to front frame 106 (e.g., center shift bar 108, left and right lift arms 112) such that body IMU 126 may detect angular movement of the body of motor grader 100.

In some embodiments, a drawbar IMU 128 (or, more specifically, a drawbar angle sensor) is mounted to drawbar 110 so as to detect angular movement of drawbar 110. In some embodiments, drawbar IMU 128 may be configured to detect a yaw angle, a pitch angle, and/or a roll angle associated with angular movement of drawbar 110.

In some embodiments, a rotation sensor 130 may be mounted to circle rotator 123, circle 116, and/or drawbar 110 so as to detect circular rotation of circle 116 with respect to drawbar 110. In some embodiments, rotation sensor 130 is integrated with circle rotator 123 such that the actuator itself (i.e., circle rotator 123) may determine an amount of circular rotation applied.

In some embodiments, a blade IMU 132 (or, more specifically, a blade angle sensor) is mounted to retainer 118 and/or blade 122 so as to detect angular movement of blade 122. In some embodiments, blade IMU 132 may be configured to detect a yaw angle, a pitch angle, and/or a roll angle associated with angular movement of blade 122. Because retainer 118 and blade 122 are linearly shifted with respect to each other, mounting blade IMU 132 to either of retainer 118 and blade 122 may allow detection of angular movement of blade 122. In some embodiments, retainer 118 may be considered a subcomponent of blade 122 such that mounting blade IMU 132 to blade 122 may imply mounting to either of retainer 118 or blade 122.

In some embodiments, a shift sensor 134 may be mounted to side shifter 125, blade 122, and/or retainer 118 so as to detect a side shift amount applied by side shifter 125 in the left or right transverse directions. In some embodiments, shift sensor 134 is integrated with side shifter 125 such that the actuator itself (i.e., side shifter 125) may determine an amount of side shift applied. Although not illustrated, in some embodiments motor grader 100 may include a yoke IMU connected to or near center shift cylinder 124 that is configured to detect drawbar yaw.

In some embodiments, a front GNSS receiver 136 may be mounted to front frame 106 so as to detect a 3D geospatial position of front frame 106 within a world space. Front GNSS receiver 136 may be mounted to a top side of front frame 106 at a particular location that allows front GNSS receiver 136 to have a substantially unimpeded view of the sky. Alternatively or additionally, front GNSS receiver 136 may be mounted to any component that is rigidly connected to front frame 106 (e.g., center shift bar 108, left and right lift arms 112) such that front GNSS receiver 136 may detect a 3D geospatial position of the body of motor grader 100.

In some embodiments, a rear GNSS receiver 138 may be mounted to cab 104 so as to detect a 3D geospatial position of cab 104 within a world space. Rear GNSS receiver 138 may be mounted to a top side of cab 104 at a particular location that allows rear GNSS receiver 138 to have a substantially unimpeded view of the sky. Alternatively or additionally, rear GNSS receiver 138 may be mounted to any component that is rigidly connected to cab 104 (e.g., tractor 102).

Data from one or more of the sensors described above may be analyzed to determine a relationship from each sensor to a machine-space reference point 140 positioned within motor grader 100. In the illustrated embodiment, machine-space reference point 140 is positioned at the articulating connection between drawbar 110 and front frame 106 (i.e., between drawbar 110 and the body of motor grader 100). Machine-space reference point 140 may alternatively or additionally be positioned within center shift bar 108 and/or front frame 106, among other possibilities.

Figure 2:
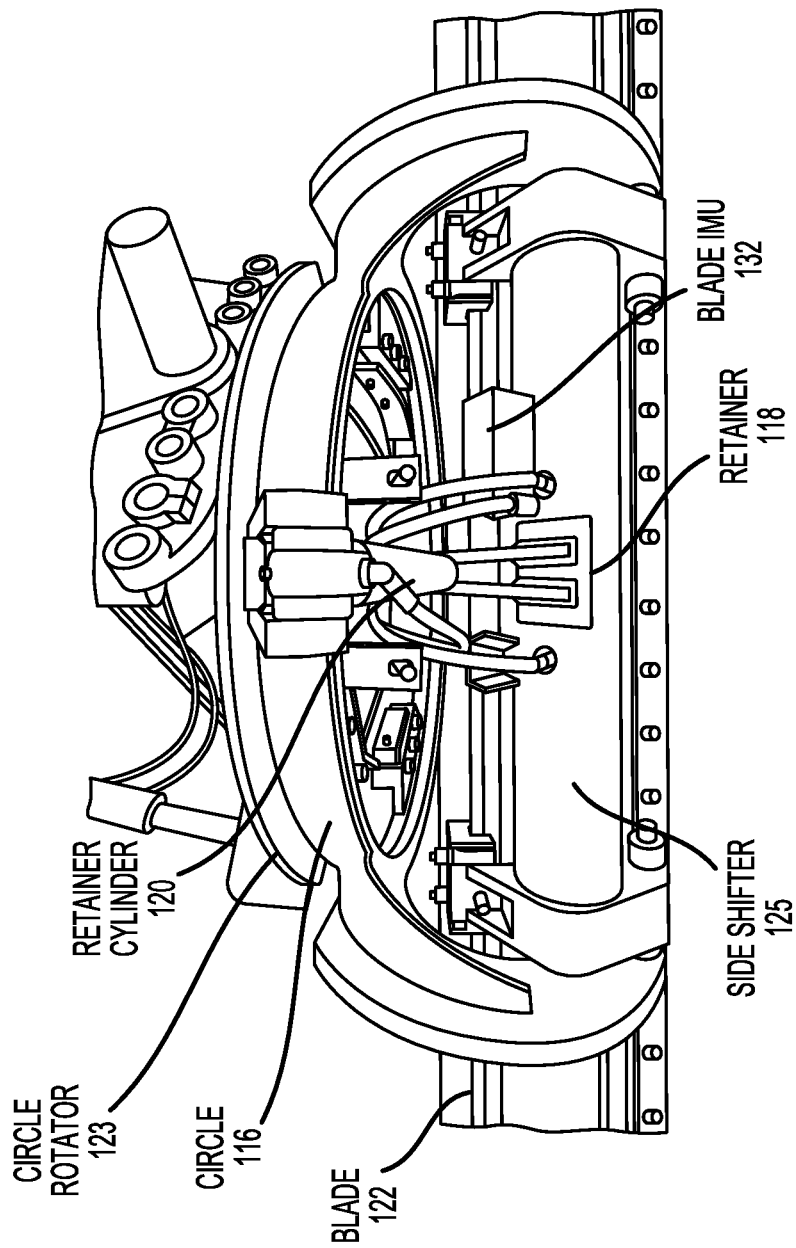
FIG. 2 illustrates a rear view of a blade of a motor grader, according to some embodiments of the present invention.

FIG. 2 illustrates a rear view of blade 122 and the surrounding components, according to some embodiments of the present invention. In the illustrated embodiment, blade IMU 132 is mounted to the rear side of retainer 118, and side shifter 125 is implemented as an internalized cylinder that causes blade 122 to shift in the left or right transverse directions.

Figure 3:
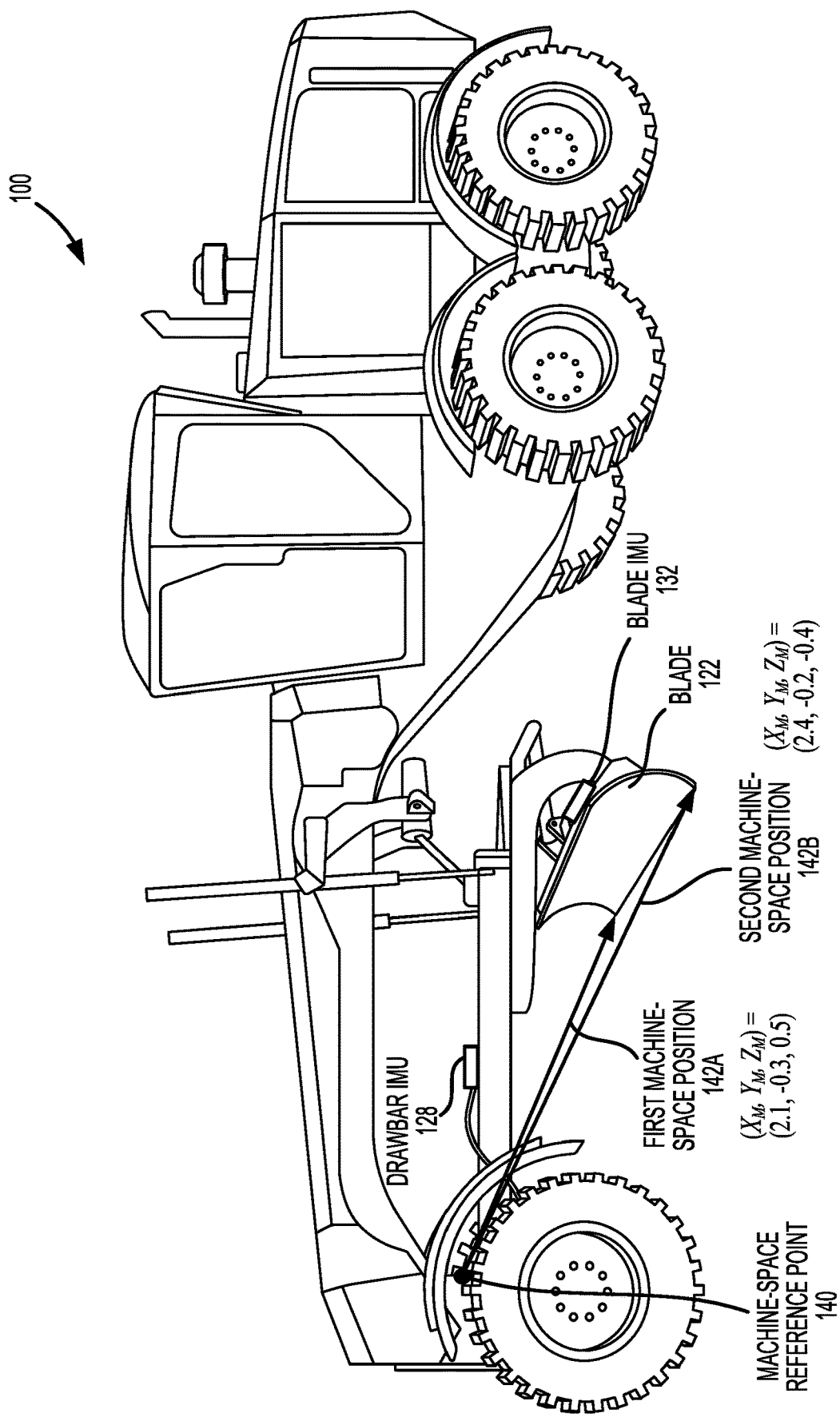
FIG. 3 illustrates a perspective view of a motor grader and a calculation of two positions along a blade within a machine space, according to some embodiments of the present invention.

FIG. 3 illustrates a perspective view of motor grader 100 and a calculation of two positions along blade 122 within the machine space, according to some embodiments of the present invention. In some embodiments, a first machine-space position 142A and a second machine-space position 142B may be calculated in reference to machine-space reference point 140. In some embodiments, calculating each of first and second machine-space positions 142 may include calculating a first and a second vector beginning at machine-space reference point 140 and ending at first and second machine-space positions 142, respectively. In some embodiments, first and second machine-space positions 142 are located at opposite ends along a bottom tip of blade 122, or at some other predetermined locations along blade 122. Examples of calculated values for first machine-space position 142A, $(X_M, Y_M, Z_M) = (2.1, -0.3, 0.5)$ and second machine-space position 142B, $(X_M, Y_M, Z_M) = (2.4, -0.2, 0.4)$ are also shown alongside the illustrated embodiment. In some embodiments, first and second machine-space positions 142 are calculated using data received from drawbar IMU 128 and blade IMU 132.

Figure 4:
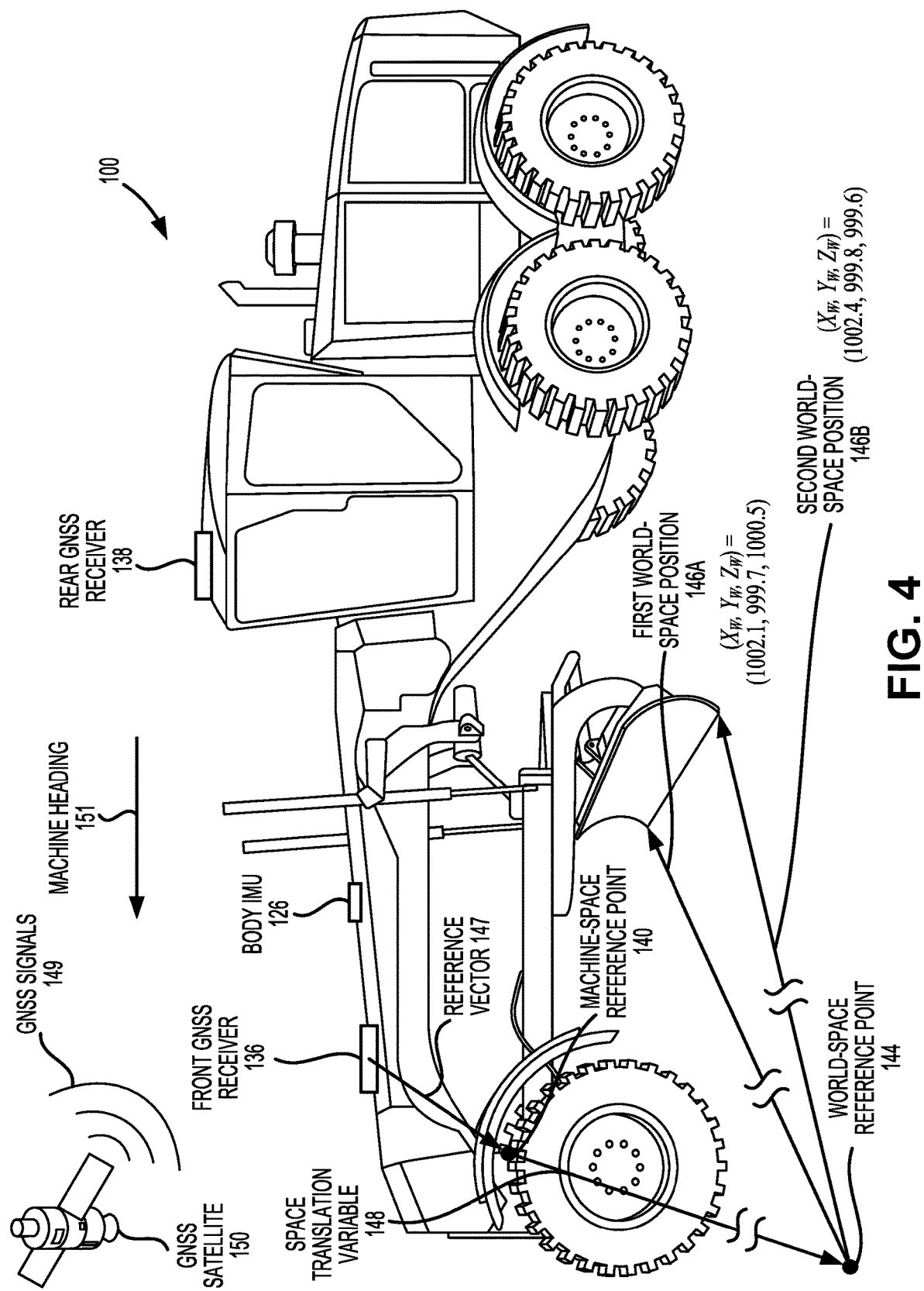
FIG. 4 illustrates a perspective view of a motor grader and a calculation of two positions along a blade within a world space, according to some embodiments of the present invention.

FIG. 4 illustrates a perspective view of motor grader 100 and a calculation of two positions along blade 122 within the world space, according to some embodiments of the present invention. In some embodiments, a first world-space position 146A and a second world-space position 146B may be calculated in reference to world-space reference point 144. In some embodiments, calculating each of first and second world-space positions 146 may include calculating a first and a second vector beginning at world-space reference point 144 and ending at first and second world-space positions 146, respectively. Examples of calculated values for first world-space position 146A, $(X_W, Y_W, Z_W) = (1002.1, 999.7, 1000.5)$ and second world-space position 146B, $(X_W, Y_W, Z_W) = (1002.4, 999.8, 999.6)$ are also shown alongside the illustrated embodiment.

In some embodiments, first and second world-space positions 146 are calculated using data received from body IMU 126 and front GNSS receiver 136 according to the following example. First, a reference vector 147 may be calculated using data received from body IMU 126. Calculating reference vector 147 may include calculating a vector beginning at front GNSS receiver 136 and ending at machine-space reference point 140. Second, a geospatial position of front GNSS receiver 136 is calculated based on received GNSS signals 149 transmitted by GNSS satellites 150. Third, a space-translation variable 148 is calculated based on reference vector 147 and the geospatial position of front GNSS receiver 136. Calculating space-translation variable 148 may include calculating a vector beginning at machine-space reference point 140 and ending at world-space reference point 144. Fourth, space translation variable 148 is incorporated into first and second machine-space positions 142 (e.g., is added to or subtracted from) to obtain first and second world space positions 146.

Additionally shown in FIG. 4 is a calculation of a machine heading 151 of motor grader 100. In some embodiments, machine heading 151 is calculated using data received from front GNSS receiver 136 and rear GNSS receiver 138. For example, machine heading 151 may be calculated based on the vector beginning at the geospatial position of rear GNSS receiver 138 and ending at the geospatial position of front GNSS receiver 136. Additional corrections to machine heading 151 can be made if either of front GNSS receiver 136 and rear GNSS receiver 138 are not aligned with a center axis of motor grader 100.

Figure 5:
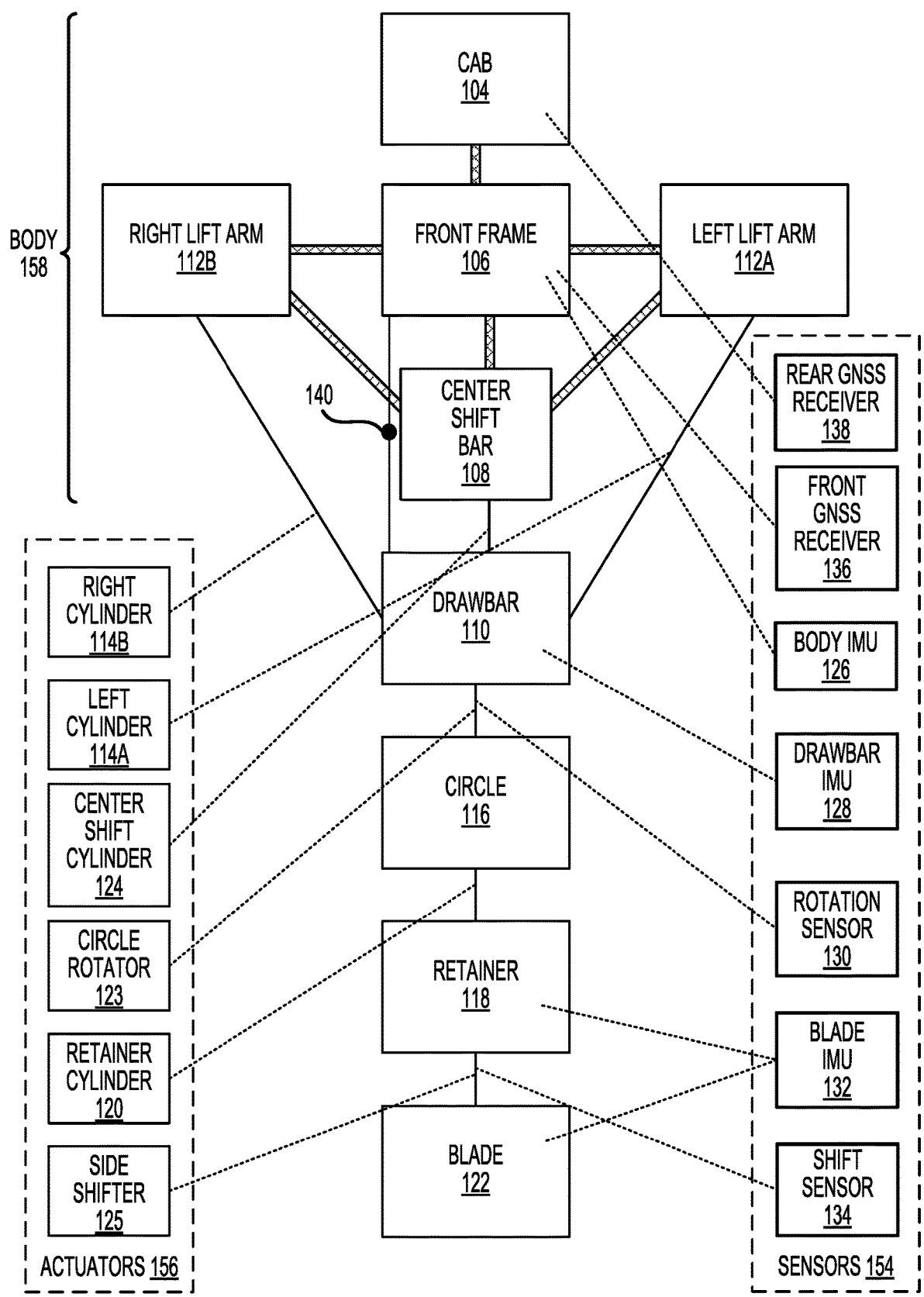
FIG. 5 illustrates a rigid body diagram of a motor grader, according to some embodiments of the present invention.

FIG. 5 illustrates a rigid body diagram of motor grader 100, according to some embodiments of the present invention. As illustrated, rigid bodies are either rigidly connected to each other (as indicated by wide connectors) or are connected via articulating connections (as indicated by narrow connectors). Some articulating connections are controlled by one or more of actuators 156 (as indicated by dotted lines). Sensors 154 may be configured to detect movement of a rigid body and/or an articulating connection (as indicated by dotted lines).

In the illustrated embodiment, motor grader 100 includes a body 158 comprising several rigidly connected components, including cab 104, front frame 106, left lift arm 112A, and right lift arm 112B. Rear GNSS receiver 138 is mounted to cab 104, front GNSS receiver 136 is mounted to front frame 106, and body IMU 126 is mounted to front frame 106. Right lift arm 112B is connected to drawbar 110 via an articulating connection controlled by right cylinder 114B, and light lift arm 112A is connected to drawbar 110 via an articulating connection controlled by left cylinder 114A. Front frame 106 is connected to drawbar 110 via an articulating connection (which may include machine-space reference point 140). Center shift bar 108 is connected to drawbar 110 via an articulating connection controlled by center shift cylinder 124. Drawbar IMU 128 is mounted to drawbar 110. Drawbar 110 is connected to circle 116 via an articulating connection controlled by circle rotator 123 with movements detected by rotation sensor 130. Circle 116 is connected to retainer 118 via an articulating connection controlled by retainer cylinder 120. Retainer 118 is connected to blade 122 via an articulating connection controlled by side shifter 125 with movements detected by shift sensor 134. Blade IMU 132 is mounted to either of retainer 118 and blade 122.

Figure 6:
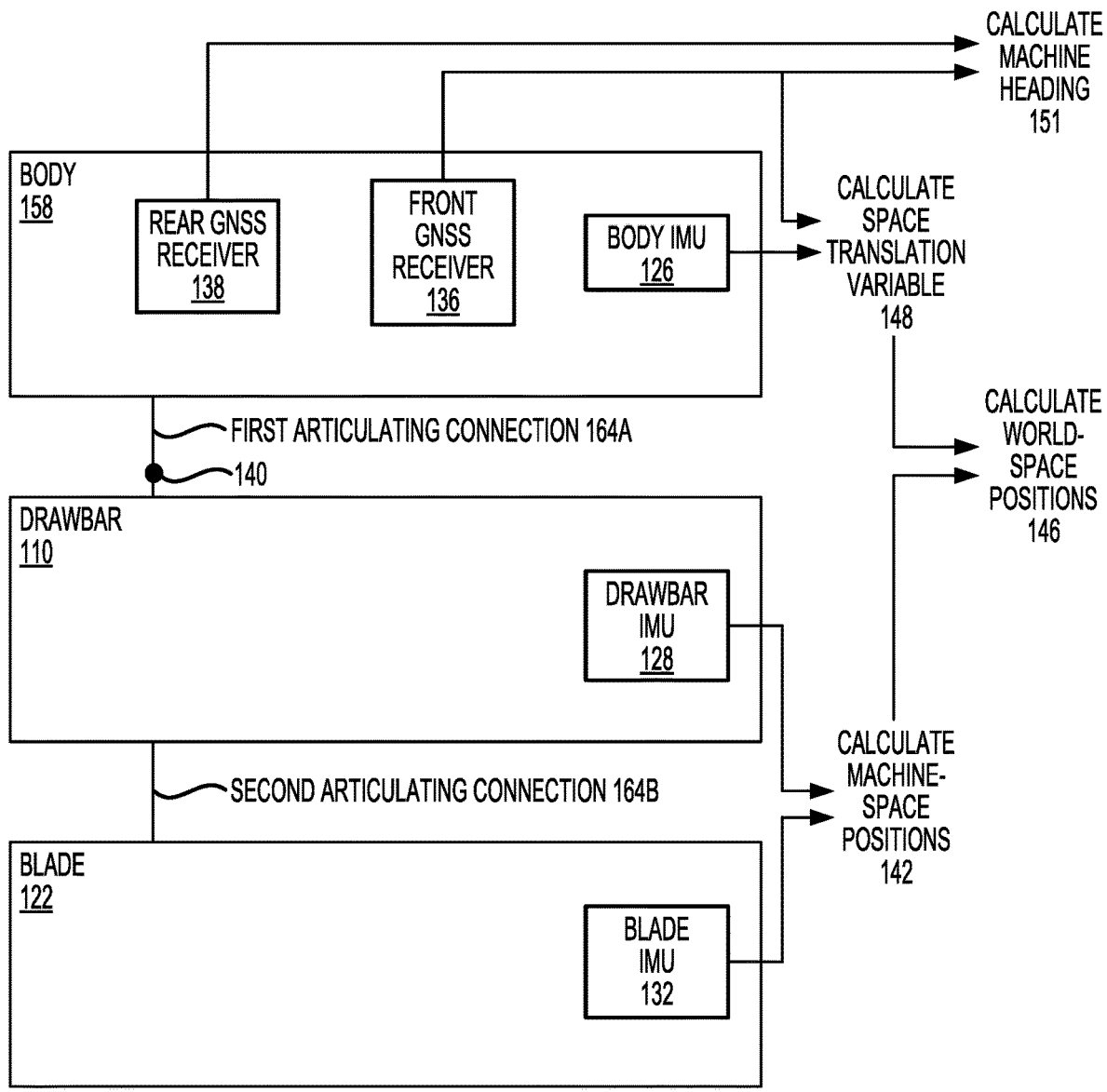
FIG. 6 illustrates a generalized rigid body diagram of a motor grader and a calculation of world-space positions, according to some embodiments of the present invention.

FIG. 6 illustrates a generalized rigid body diagram of motor grader 100 and a calculation of world-space positions 146, according to some embodiments of the present invention. In the illustrated embodiment, motor grader 100 includes body 158, drawbar 110, and blade 122, connected by a first articulating connection 164A (between body 158 and drawbar 110) and a second articulating connection 164B (between drawbar 110 and blade 122). Machine-space reference point 140 may be positioned at first articulating connection 164A, among other possibilities. In some embodiments, second articulating connection 164B may include one or more rigid bodies, articulating connections, and/or actuators between drawbar 110 and blade 122. In some embodiments, blade 122 includes retainer 118 and the articulating connection between blade 122 and retainer 118.

In some embodiments, machine heading 151 is calculated based on data received from rear GNSS receiver 138 and front GNSS receiver 136. In some embodiments, space translation variable 148 is calculated based on data received from body IMU 126 and front GNSS receiver 136. In some embodiments, machine-space positions 142 are calculated based on data received from drawbar IMU 128 and blade IMU 132. In some embodiments, world-space positions 146 are calculated based on space translation variable 148 and machine-space positions 142.

Figure 7:
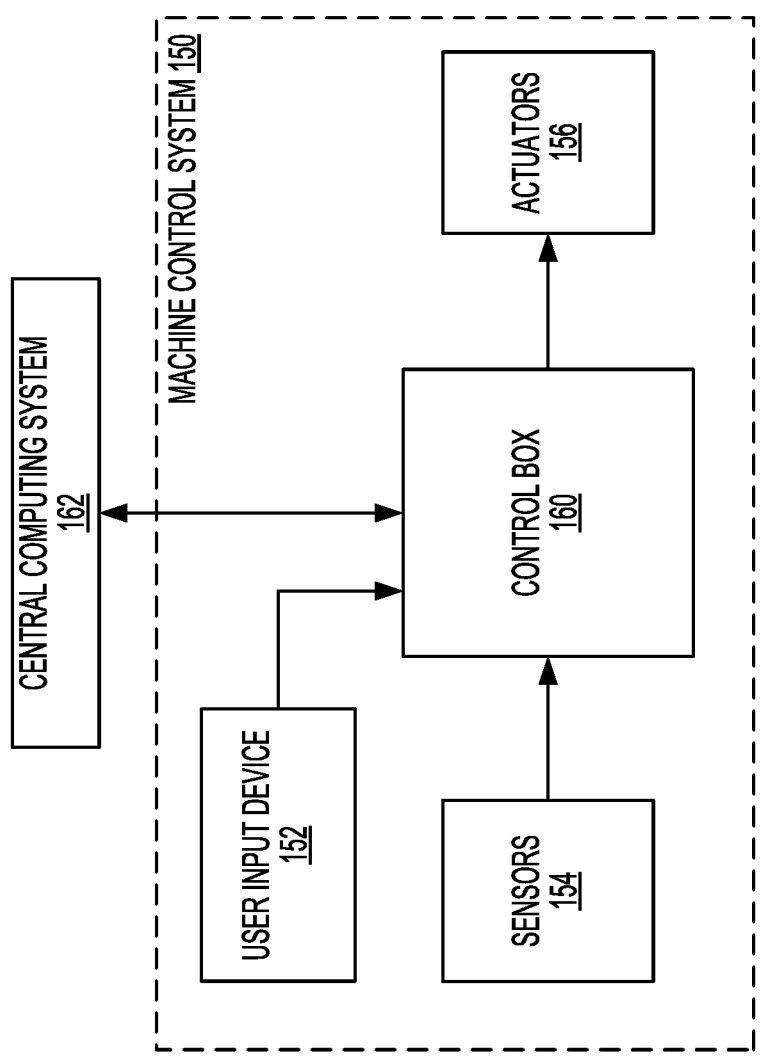
FIG. 7 illustrates a machine control system, according to some embodiments of the present invention.

FIG. 7 illustrates a machine control system 150, according to some embodiments of the present invention. Machine control system 150 includes various sensors, input devices, actuators, and processors for allowing an operator of motor grader 100 to complete a high-precision grading operation. The components of machine control system 150 may be mounted to or integrated with the components of motor grader 100 such that motor grader 100 may include machine control system 150. The components of machine control system 150 may be communicatively coupled to each other via one or more wired and/or wireless connections.

Machine control system 150 may include a control box 160 that receives data from sensors 154, user input device 152, and a central computing system 162, and generates commands that are sent to actuators 156. Control box 160 may include one or more processors and an associated memory. In some embodiments, control box 160 may be communicatively coupled to central computing system 162 located external to machine control system 150 and motor grader 100. Central computing system 162 may send instructions to control box 160 of the details of a grading operation, such as an area to be graded, a desired slope, etc. Central computing system 162 may also send alerts and other general information to control box 160, such as traffic conditions, weather conditions, the locations and status of material transfer vehicles, and the like.

In some embodiments, machine control system 150 includes a user input device 152 for receiving a desired slope (or other instruction) and sending the desired slope to control box 160. User input device 152 may be a keyboard, a touchscreen, a touchpad, a switch, a lever, a button, a steering wheel, an acceleration pedal, a brake pedal, and the like. User input device 152 may be mounted to tractor 102, within cab 104, or any other physical part of motor grader 100. User input device 152 may further receive user inputs indicating a desired movement speed of motor grader 100, a desired turning angle of motor grader 100, a desired operational position of any of actuators 156, and the like.

Figure 8:
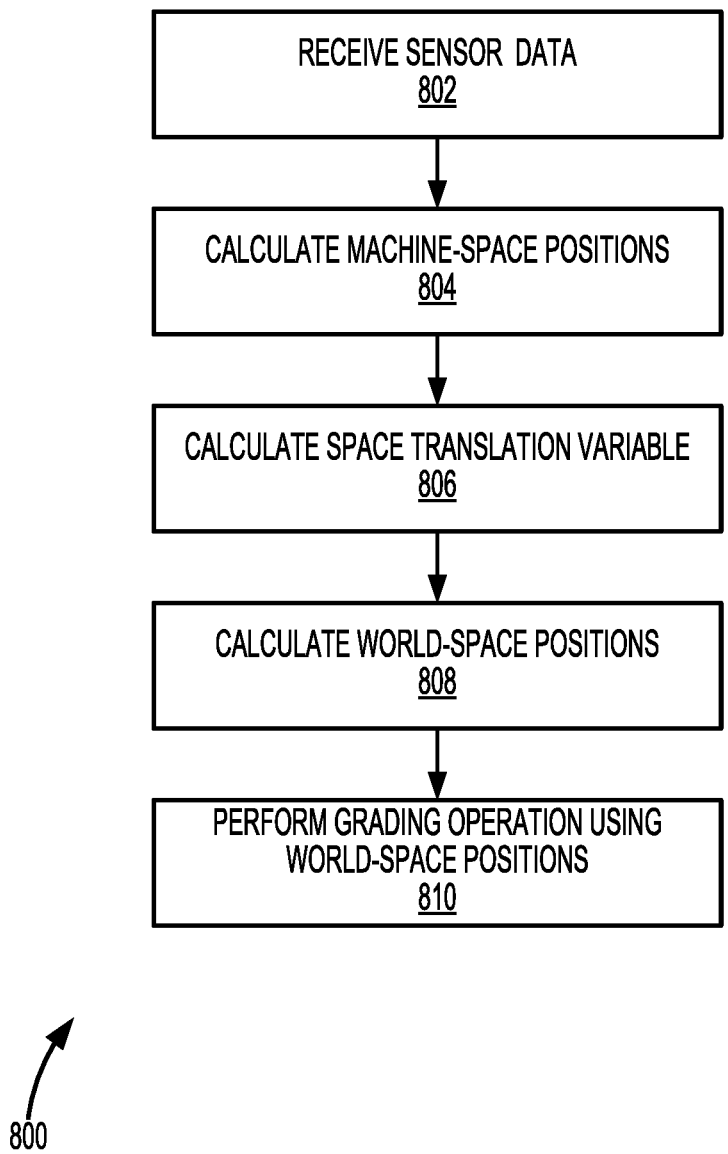
FIG. 8 illustrates a method of operating a motor grader, according to some embodiments of the present invention.

FIG. 8 illustrates a method 800 of operating motor grader 100, according to some embodiments of the present invention. One or more steps of method 800 may be performed in a different order than that shown in the illustrated embodiment, and one or more steps of method 800 may be omitted during performance of method 800.

At step 802, sensor data detected by sensors 154 is received. In some embodiments, the sensor data is received by control box 160 from sensors 154. The sensor data may include body angle data detected by a body angle sensor (e.g., body IMU 126) mounted to body 158, drawbar angle data detected by a drawbar sensor (e.g., drawbar IMU 128) mounted to drawbar 110, blade angle data detected by a blade sensor (e.g., blade IMU 132) mounted to blade 122, and a geospatial position of body 158 within world space detected by front GNSS receiver 136 mounted to body 158. The sensor data may be received sequentially or concurrently by control box 160. The sensor data may include raw data or may directly include the quantities of interest. For example, the body angle data may include a yaw angle, a pitch angle, and/or a roll angle associated with angular movement of body 158, the drawbar angle data may include a yaw angle, a pitch angle, and/or a roll angle associated with angular movement of drawbar 110, and the blade angle data may include a yaw angle, a pitch angle, and/or a roll angle associated with angular movement of blade 122.

At step 804, control box 160 calculates first and second machine-space positions 142 based on the drawbar angle data and the blade angle data. In some embodiments, first and second machine-space positions 142 are calculated in reference to machine-space reference point 140. In some embodiments, first and second machine-space positions 142 are located at opposite ends along a bottom tip of blade 122, or at some other predetermined locations along blade 122. In one example, first and second machine-space positions 142 are initialized when motor grader 100 is powered on (to the previously calculated values when motor grader 100 was last powered off, or to a predetermined initial set of values), and the initialized values are modified using 3D transformation techniques based on the yaw angles, pitch angles, and roll angles of the drawbar angle data and the blade angle data.

At step 806, control box 160 calculates space translation variable 148 based on the geospatial position of body 158 and the body angle data. In some embodiments, space translation variable 148 includes a vector beginning at machine-space reference point 140 and ending at world-space reference point 144 (or vice-versa) that allows translation of 3D coordinates between the machine space and the world space. In some embodiments, calculating space translation variable 148 includes first calculating reference vector 147 (the vector beginning at the geospatial position of body 158 and ending at machine-space reference point 140) based on the body angle data, and then adding or subtracting reference vector 147 to/from the geospatial position of body 158. In one example, space translation variable 148 is initialized when motor grader 100 is powered on (to the previously calculated value when motor grader 100 was last powered off, or to a predetermined initial value), and the initialized value is modified using 3D transformation techniques based on the yaw angle, pitch angle, and roll angle of the body angle data.

At step 808, control box 160 calculates first and second world-space positions 146 based on space translation variable 148 (i.e., based on geospatial position of body 158 and the body angle data) and first and second machine-space positions 142 (i.e., based on the drawbar angle data and the blade angle data). In some embodiments, first and second world-space positions 146 are calculated in reference to world-space reference point 144. In some embodiments, first and second world-space positions 146 are calculated by adding or subtracting space translation variable 148 to/from first and second machine-space positions 142.

At step 810, movement of at least one of first articulating connection 164A and second articulating connection 164B is caused based on first and second world-space positions 146. In some embodiments, the movement is caused by control box 160 generating and sending a command to one of actuators 156. The command may be generated as a result of a computation that models the current position of blade 122 using first and second world-space positions 146. For example, control box 160 may generate and send a command to retainer cylinder 120 to increase the pitch angle of blade 122 because a current pitch of blade 122, as indicated by first and second world-space positions 146, is less than a desired pitch angle. As another example, control box 160 may generate and send commands to left and right cylinders 114 to decrease the elevation of blade 122 because a current elevation of blade 122, as indicated by first and second world-space positions 146, is greater than a desired elevation. Other possibilities are contemplated.

Figure 9:
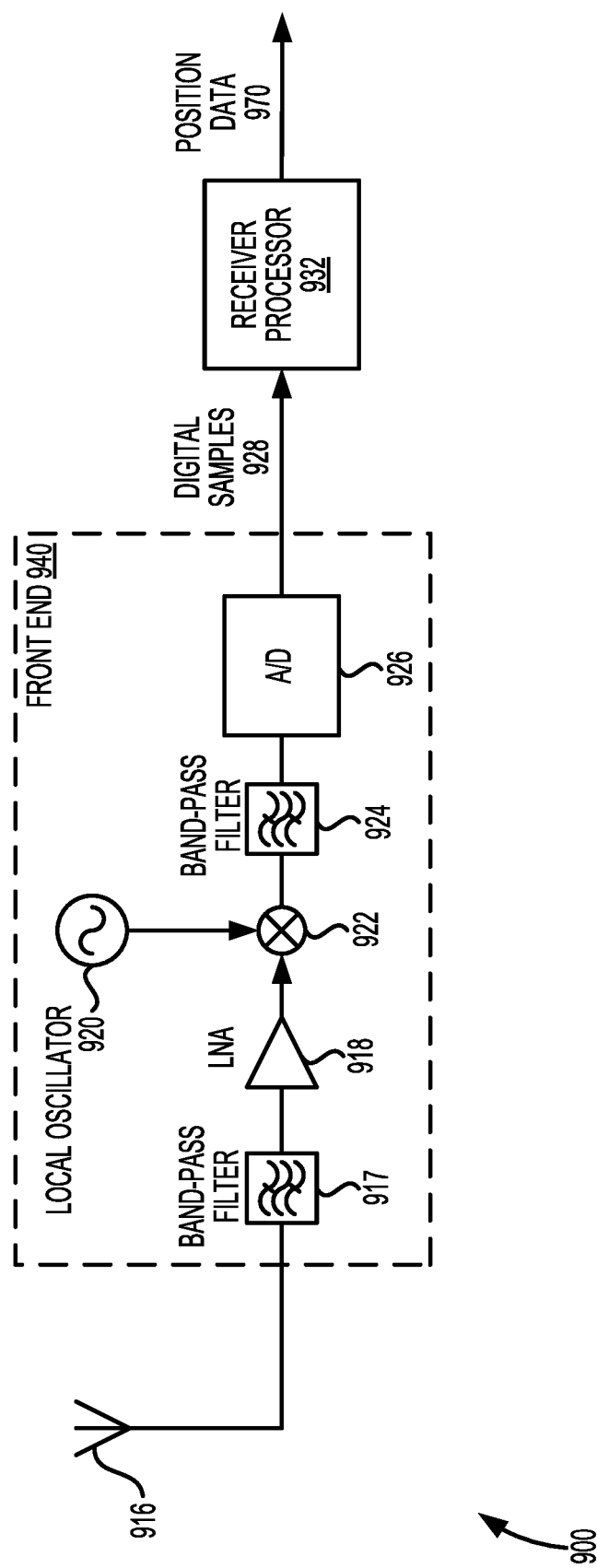
FIG. 9 illustrates an example of a Global Navigation Satellite System (GNSS) receiver, according to some embodiments of the present invention.

FIG. 9 illustrates a block diagram of a GNSS receiver 900, according to some embodiments of the present invention. The following description of GNSS receiver 900 may correspond to either of front GNSS receiver 136 or rear GNSS receiver 138. In some embodiments, GNSS receiver 900 includes an antenna 916 for receiving GNSS signals 149 from GNSS satellites 150 and sending/routing a signal related to GNSS signals 149 to a front end 940. Antenna 916 may be linearly or circularly polarized, may be mounted or embedded, may be a single antenna or an array antenna, may have a narrow or wide bandwidth, among other possibilities. Front end 940 may include a band-pass filter 917 for initially filtering out undesirable frequency components outside the frequencies of interest, a low-noise amplifier (LNA) 918 for amplifying the received signal, a local oscillator 920 and a mixer 922 for down converting the received signal from RF to intermediate frequencies (IF), a band-pass filter 924 for removing frequency components outside IF, and an analog-to-digital (A/D) converter 926 for sampling the received signal to generate digital samples 928.

In some instances, front end 940 includes additional or fewer components than that shown in FIG. 9. For example, front end 940 may include a second local oscillator (90 degrees out of phase with respect to local oscillator 920), a second mixer, a second band-pass filter, and a second A/D converter for generating digital samples corresponding to the quadrature component of GNSS signals 149. Digital samples corresponding to the in-phase component of GNSS signals 149 and digital samples corresponding to the quadrature component of GNSS signals 149 may both be sent to receiver processor 932. In some embodiments, digital samples corresponding to both in-phase and quadrature components may be included in digital samples 928. In some embodiments, receiver processor 932 may include one or more correlators.

Other components within front end 940 may include a phase-locked loop (PLL) for synchronizing the phase of local oscillator 920 with the phase of the received signal, and a phase shifter for generating a second mixing signal using local oscillator 920 that is 90 degrees out of phase with local oscillator 920. In some embodiments, front end 940 does not include band-pass filter 917 and LNA 918. In some embodiments, A/D converter 926 is coupled directly to antenna 916 and samples the RF signal directly without down-conversion to IF. In some embodiments, front end 940 only includes band-pass filter 917 and A/D converter 926. Other possible configurations of front end 940 are contemplated.

Receiver processor 932 may perform one or more correlations on digital samples 928 using local codes to generate distance estimates between GNSS receiver 900 and GNSS satellites 150. In some embodiments, one or more components of receiver processor 932 (such as, for example, one or more correlators) include specific pieces of hardware, such as an application-specific integrated circuit (ASIC) or a field-programmable gate array (FPGA). In some embodiments, operations performed by receiver processor 932 are performed entirely in software using digital signal processing (DSP) techniques. After generating the distance estimates, receiver processor 932 may perform trilateration to generate a position estimate for GNSS receiver 900. After generating at least one position estimate, receiver processor 932 may output position data 970 comprising a single or a plurality of GNSS points (i.e., position estimates). Each of the plurality of GNSS points may be a 3D coordinate represented by three numbers. In some embodiments, the three numbers may correspond to latitude, longitude, and elevation/altitude. In other embodiments, the three numbers may correspond to X, Y, and Z positions. Position data 970 may be outputted to be displayed to a user, transmitted to a separate device (e.g., computer, smartphone, server, etc.) via a wired or wireless connection, or further processed, among other possibilities.

Figure 10A:
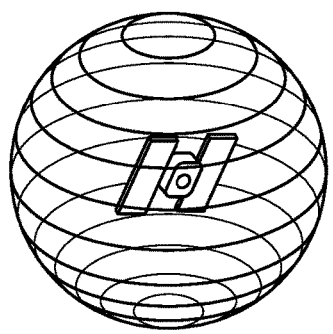
FIGS. 10A-10D illustrate a trilateration technique performed by a GNSS receiver to generate a position estimate, according to some embodiments of the present invention.
Figure 10B:
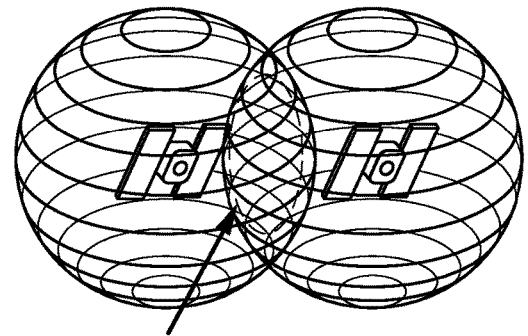

FIGS. 10A-10D illustrate a trilateration technique performed by GNSS receiver 900 to generate a position estimate, according to some embodiments of the present invention. FIG. 10A shows a first scenario in which GNSS receiver 900 receives GNSS signals 149 from a first satellite and generates a distance estimate (e.g., 20,200 km) for that satellite. This informs GNSS receiver 900 that it is located somewhere on the surface of a sphere with a radius of 20,200 km, centered on the first satellite. FIG. 10B shows a second scenario in which GNSS receiver 900 receives GNSS signals 149 from a second satellite and generates a distance estimate (e.g., 23,000 km) for the additional satellite. This informs GNSS receiver 900 that it is also located somewhere on the surface of a sphere with a radius of 23,000 km, centered on the second satellite. This limits the possible locations to somewhere on the circle where the first sphere and second sphere intersect.

Figure 10C:
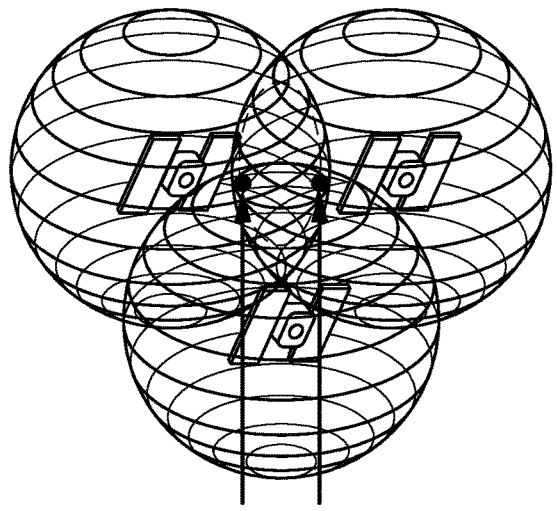
Figure 10D:
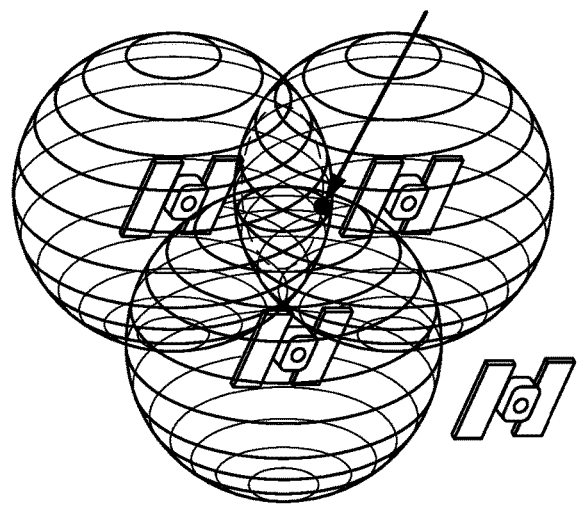

FIG. 10C shows a third scenario in which GNSS receiver 900 receives GNSS signals 149 from a third satellite and generates a distance estimate (e.g., 25,800 km) for the additional satellite. This informs GNSS receiver 900 that it is also located somewhere on the surface of a sphere with a radius of 25,800 km, centered on the third satellite. This limits the possible locations to two points where the first sphere, the second sphere, and the third sphere intersect. FIG. 10D shows a fourth scenario in which GNSS receiver 900 receives GNSS signals 149 from a fourth satellite. The fourth satellite can be used to resolve which of the two points is the correct one (by generating a fourth sphere) and/or to synchronize the receiver's clock with the satellites' time.

Figure 11:
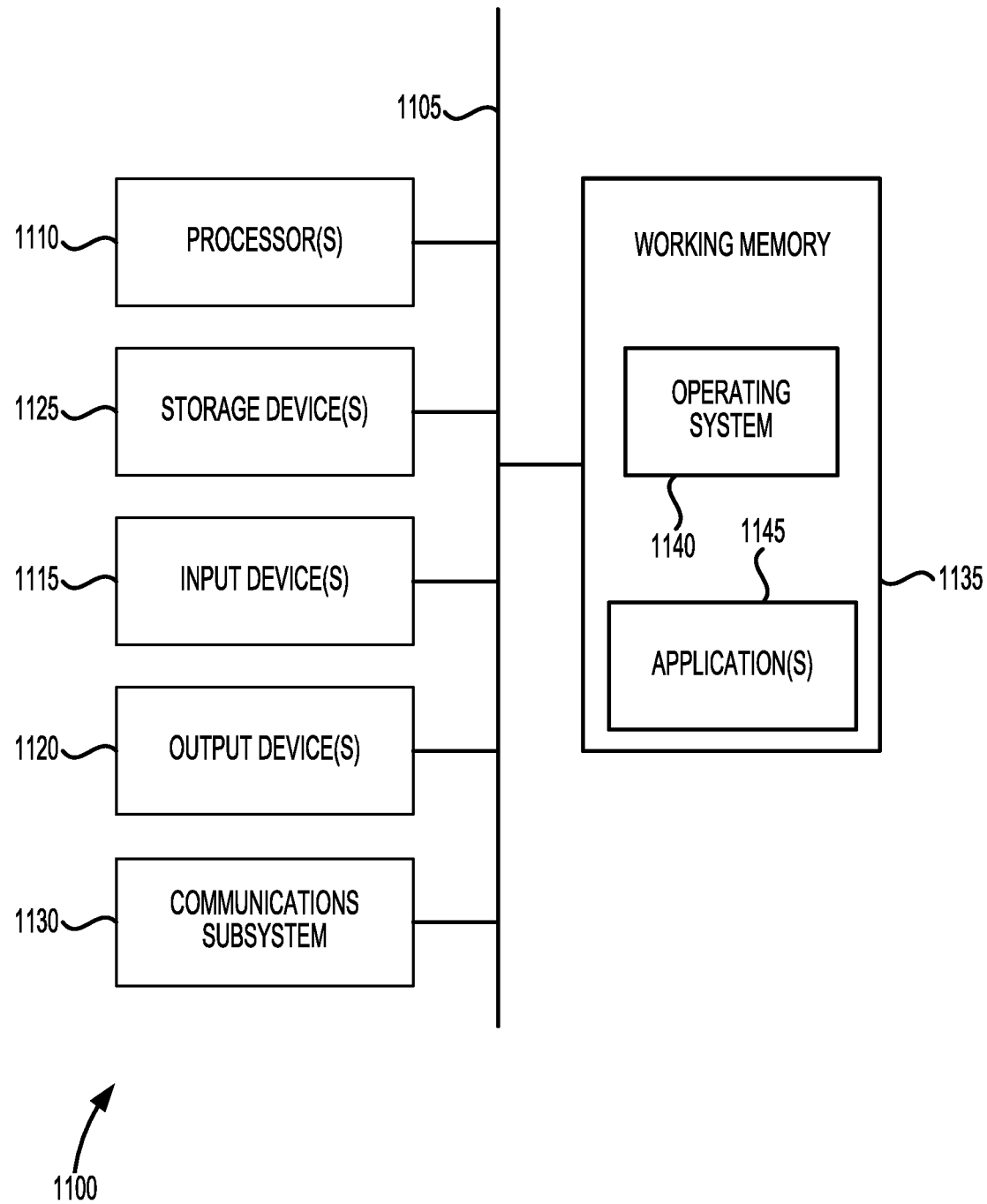
FIG. 11 illustrates a simplified computer system, according to some embodiments of the present invention.

FIG. 11 illustrates a simplified computer system 1100, according to some embodiments of the present invention. Computer system 1100 as illustrated in FIG. 11 may be incorporated into devices such as control box 160, sensors 154, actuators 156, or some other device described herein. FIG. 11 provides a schematic illustration of one embodiment of computer system 1100 that can perform some or all of the steps of the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or more integrated manner.

Computer system 1100 is shown comprising hardware elements that can be electrically coupled via a bus 1105, or may otherwise be in communication, as appropriate. The hardware elements may include one or more processors 1110, including without limitation one or more general-purpose processors and/or one or more special-purpose processors such as digital signal processing chips, graphics acceleration processors, and/or the like; one or more input devices 1115, which can include, without limitation a mouse, a keyboard, a camera, and/or the like; and one or more output devices 1120, which can include, without limitation a display device, a printer, and/or the like.

Computer system 1100 may further include and/or be in communication with one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1100 might also include a communications subsystem 1130, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1130 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1130. In other embodiments, a portable electronic device, e.g. the first electronic device, may be incorporated into computer system 1100, e.g., an electronic device as an input device 1115. In some embodiments, computer system 1100 will further comprise a working memory 1135, which can include a RAM or ROM device, as described above.

Computer system 1100 also can include software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1125 described above. In some cases, the storage medium might be incorporated within a computer system, such as computer system 1100. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1100 and/or might take the form of source and/or installable code, which, upon compilation and/or installation on computer system 1100 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 1100 to perform methods in accordance with various embodiments of the technology. According to a set of embodiments, some or all of the procedures of such methods are performed by computer system 1100 in response to processor 1110 executing one or more sequences of one or more instructions, which might be incorporated into the operating system 1140 and/or other code, such as an application program 1145, contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1100.

The communications subsystem 1130 and/or components thereof generally will receive signals, and the bus 1105 then might carry the signals and/or the data, instructions, etc. carried by the signals to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A construction machine comprising:
   a body including at least a front frame;
   a body angle sensor configured to detect body angle data corresponding to movement of the body;
   a front GNSS receiver mounted to the body and configured to detect a geospatial position of the body within a world space;
   a drawbar coupled to the body via a first articulating connection;
   a drawbar angle sensor configured to detect drawbar angle data corresponding to movement of the drawbar;
   a blade coupled to the drawbar via a second articulating connection;
   a blade angle sensor configured to detect blade angle data corresponding to movement of the blade; and
   one or more processors configured to perform operations comprising:
      receiving, from the body angle sensor, the body angle data;
      receiving, from the drawbar angle sensor, the drawbar angle data;
      receiving, from the blade angle sensor, the blade angle data;
      receiving, from the front GNSS receiver, the geospatial position of the body within the world space;
      calculating, based on the drawbar angle data and the blade angle data, a first and a second position on the blade within a machine space, wherein the machine space includes a machine-space reference point positioned within the construction machine;
      calculating, based on the body angle data, the geospatial position, and the first and second positions on the blade within the machine space, a first and a second position on the blade within the world space; and
      causing movement of at least one of the first articulating connection and the second articulating connection based on the first and second positions on the blade within the world space.

2. The construction machine of claim 1, wherein:
   the body angle sensor is mounted to the front frame;
   the drawbar angle sensor is mounted to the drawbar;
   the blade angle sensor is mounted to the blade; and
   the front GNSS receiver is mounted to the front frame, wherein the geospatial position of the body is a geospatial position of the front frame.

3. The construction machine of claim 2, further comprising a rear GNSS receiver mounted to a cab of the body and configured to detect a geospatial position of the cab, and wherein the operations further comprise:
   receiving, from the rear GNSS receiver, the geospatial position of the cab;
   calculating, based on the geospatial position of the front frame and the geospatial position of the cab, a machine heading of the construction machine; and
   causing movement of at least one of the first articulating connection and the second articulating connection based on the machine heading.

4. The construction machine of claim 1, wherein the machine-space reference point is the first articulating connection.

5. The construction machine of claim 1, wherein calculating the first and second positions on the blade within the machine space includes calculating a first and a second vector beginning at the machine-space reference point and ending at the first and second positions on the blade within the machine space.

6. The construction machine of claim 1, wherein the first and second positions on the blade within the machine space are located at opposite ends along a bottom tip of the blade.

7. The construction machine of claim 1, wherein the operations further comprise:
calculating, based on the body angle data and the geospatial position of the body, a space translation variable.

8. A machine control system comprising:
a body angle sensor configured to detect body angle data corresponding to movement of a body of a construction machine, wherein the body includes at least a front frame;
a front GNSS receiver configured to detect a geospatial position of the body within a world space;
a drawbar angle sensor configured to detect drawbar angle data corresponding to movement of a drawbar of the construction machine, wherein the drawbar is coupled to the body via a first articulating connection;
a blade angle sensor configured to detect blade angle data corresponding to movement of a blade of the construction machine, wherein the blade is coupled to the drawbar via a second articulating connection; and
one or more processors configured to perform operations comprising:
receiving, from the body angle sensor, the body angle data;
receiving, from the drawbar angle sensor, the drawbar angle data;
receiving, from the blade angle sensor, the blade angle data;
receiving, from the front GNSS receiver, the geospatial position of the body within the world space;
calculating, based on the drawbar angle data and the blade angle data, a first and a second position on the blade within a machine space, wherein the machine space includes a machine-space reference point positioned within the construction machine;
calculating, based on the body angle data, the geospatial position, and the first and second positions on the blade within the machine space, a first and a second position on the blade within the world space; and
causing movement of at least one of the first articulating connection and the second articulating connection based on the first and second positions on the blade within the world space.

9. The machine control system of claim 8, wherein:
the body angle sensor is mounted to the front frame;
the drawbar angle sensor is mounted to the drawbar;
the blade angle sensor is mounted to the blade; and
the front GNSS receiver is mounted to the front frame, wherein the geospatial position of the body is a geospatial position of the front frame.

10. The machine control system of claim 9, further comprising a rear GNSS receiver mounted to a cab of the body and configured to detect a geospatial position of the cab, and wherein the operations further comprise:
receiving, from the rear GNSS receiver, the geospatial position of the cab;
calculating, based on the geospatial position of the front frame and the geospatial position of the cab, a machine heading of the construction machine; and
causing movement of at least one of the first articulating connection and the second articulating connection based on the machine heading.

11. The machine control system of claim 8, wherein the machine-space reference point is the first articulating connection.

12. The machine control system of claim 8, wherein calculating the first and second positions on the blade within the machine space includes calculating a first and a second vector beginning at the machine-space reference point and ending at the first and second positions on the blade within the machine space.

13. The machine control system of claim 8, wherein the first and second positions on the blade within the machine space are located at opposite ends along a bottom tip of the blade.

14. The machine control system of claim 8, wherein the operations further comprise:
calculating, based on the body angle data and the geospatial position of the body, a space translation variable.

15. A method of operating a construction machine, the method comprising:
receiving, from a body angle sensor, body angle data corresponding to movement of a body of a construction machine, wherein the body includes at least a front frame;
receiving, from a front GNSS receiver mounted to the body, a geospatial position of the body within the world space;
receiving, from a drawbar angle sensor, drawbar angle data corresponding to movement of a drawbar of the construction machine, wherein the drawbar is coupled to the body via a first articulating connection;
receiving, from a blade angle sensor, blade angle data corresponding to movement of a blade of the construction machine, wherein the blade is coupled to the drawbar via a second articulating connection;
calculating, based on the drawbar angle data and the blade angle data, a first and a second position on the blade within a machine space, wherein the machine space includes a machine-space reference point positioned within the construction machine;
calculating, based on the body angle data, the geospatial position, and the first and second positions on the blade within the machine space, a first and a second position on the blade within the world space; and
causing movement of at least one of the first articulating connection and the second articulating connection based on the first and second positions on the blade within the world space.

16. The method of claim 15, wherein:
the body angle sensor is mounted to the front frame;
the drawbar angle sensor is mounted to the drawbar;
the blade angle sensor is mounted to the blade; and
the front GNSS receiver is mounted to the front frame, wherein the geospatial position of the body is a geospatial position of the front frame.

17. The method of claim 16, further comprising:
receiving, from a rear GNSS receiver mounted to a cab of the body, the geospatial position of the cab;
calculating, based on the geospatial position of the front frame and the geospatial position of the cab, a machine heading of the construction machine; and
causing movement of at least one of the first articulating connection and the second articulating connection based on the machine heading.

18. The method of claim 15, wherein the machine-space reference point is the first articulating connection.

19. The method of claim 15, wherein calculating the first and second positions on the blade within the machine space includes calculating a first and a second vector beginning at the machine-space reference point and ending at the first and second positions on the blade within the machine space.

20. The method of claim 15, wherein the first and second positions on the blade within the machine space are located at opposite ends along a bottom tip of the blade.

* * * * *